United States Patent
Sadow, Jr. et al.

[11] 3,797,213
[45] Mar. 19, 1974

[54] COMBINED SAFETY GUARD AND FLIP-OVER HANDLE FOR LAWNMOWERS

[75] Inventors: Peter Thomas Sadow, Jr., Cockeysville; Thaddeus Eugene Bednarski, Timonium; Allen George Beares, Towson, all of Md.

[73] Assignee: The Black and Decker Manufacturing Company, Towson, Md.

[22] Filed: Jan. 2, 1973

[21] Appl. No.: 320,065

[52] U.S. Cl............................ 56/320.1, 56/17.4
[51] Int. Cl..................... A01d 67/00, A01d 55/18
[58] Field of Search ...... 56/320.1, 320.2, 256, 17.4, 56/17.5, 17.2

[56] References Cited
UNITED STATES PATENTS

| | | | |
|---|---|---|---|
| 3,715,875 | 2/1973 | Brucker | 56/320.1 |
| 3,226,920 | 1/1966 | Gilbertson | 56/255 |
| 3,481,123 | 12/1969 | Lessig | 56/17.5 |
| 2,561,293 | 7/1951 | Ross | 56/17.4 |
| 2,578,880 | 12/1951 | Doyle | 56/17.2 |

*Primary Examiner*—Russell R. Kinsey

[57] ABSTRACT

A rotary power-operated lawnmower of the type having a wheel supported deck housing provided with an upstanding handle pivotally supported on the deck housing for reversal or flip-over movement to facilitate opposite directional, longitudinal movement of the mower without the necessity of turning it around, the mower being provided with a novel safety guard construction pivotally supported on the deck housing and operatively connected with the handle through flexible cable means, or pivoted on the deck and connected directly to the handle, the construction being such that the safety guard is positively pivotally moved by flip-over movement of the handle from either of its operative positions so that it is positioned to protect the operator's feet in both longitudinal directions of movement of the mower and to minimize interference with efficient grass cutting. In addition, the handle is shown as provided with latch means for releasably latching the handle in both of its operative positions.

15 Claims, 12 Drawing Figures

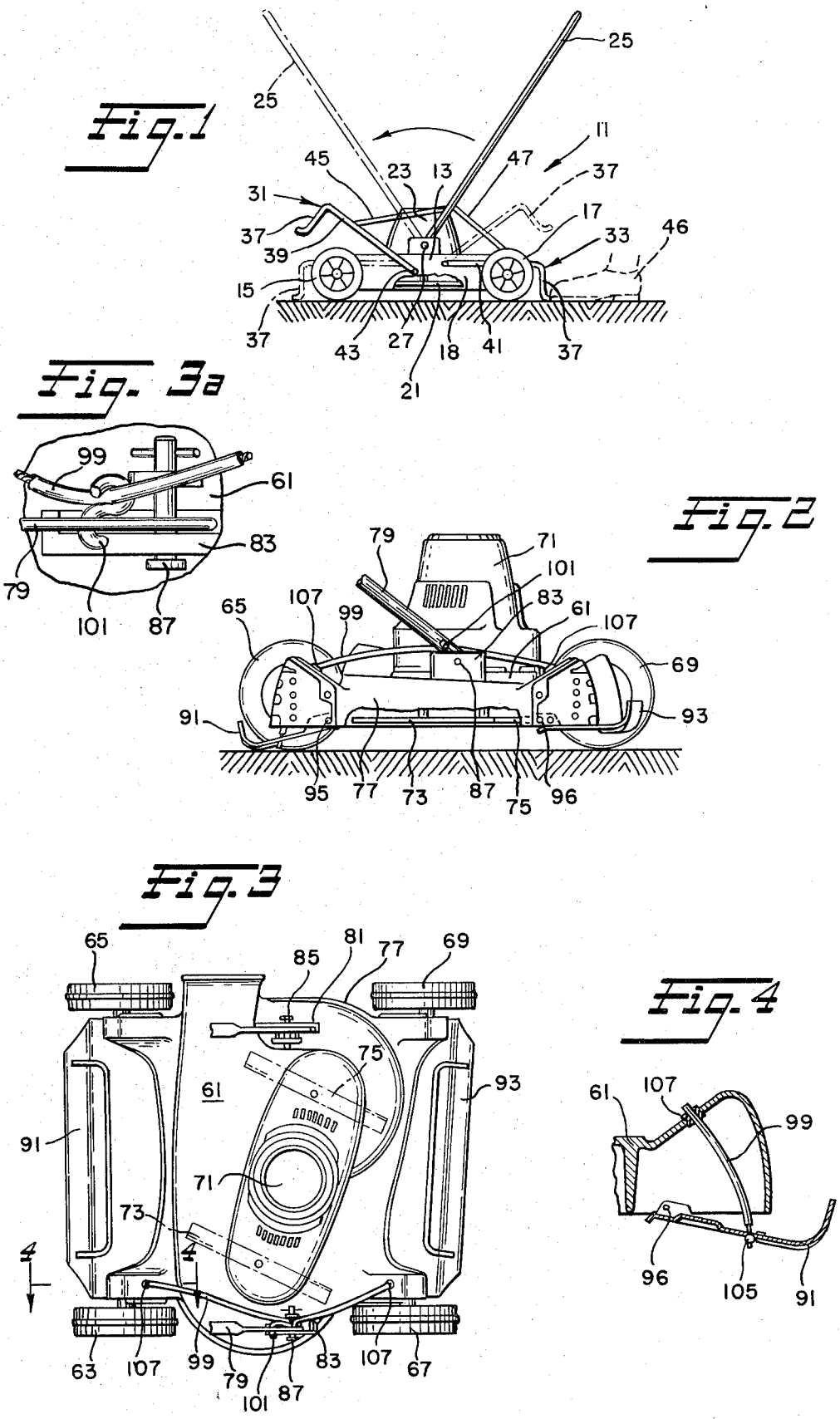

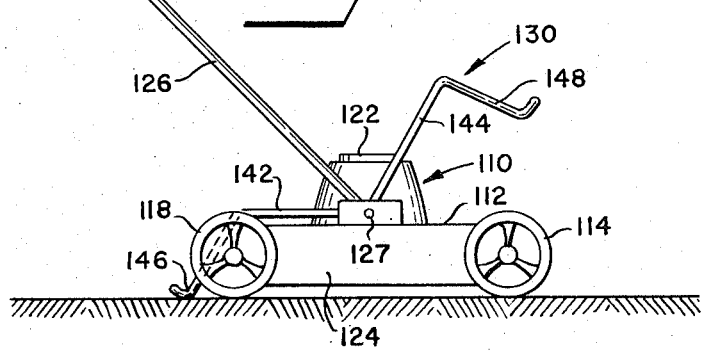
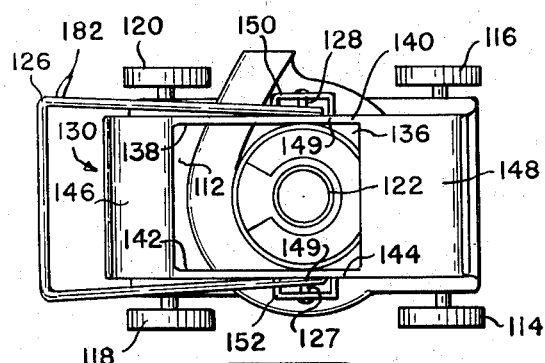
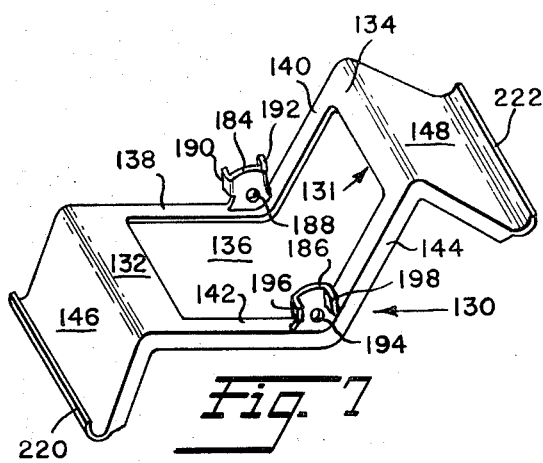
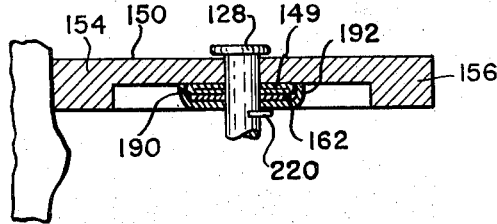
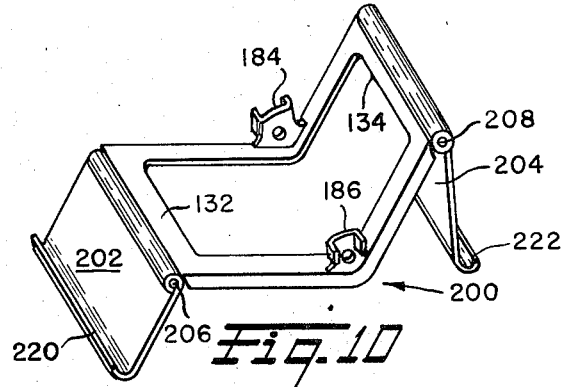
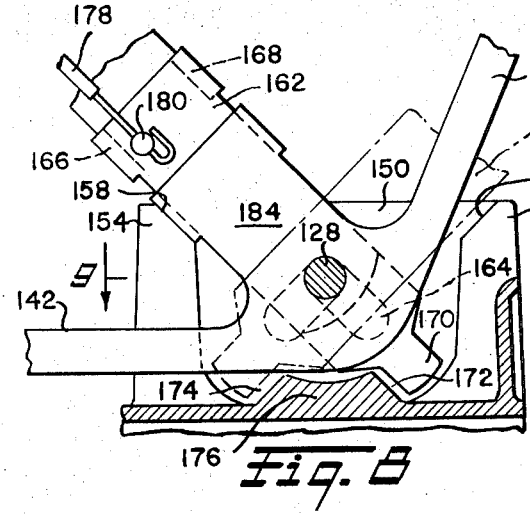
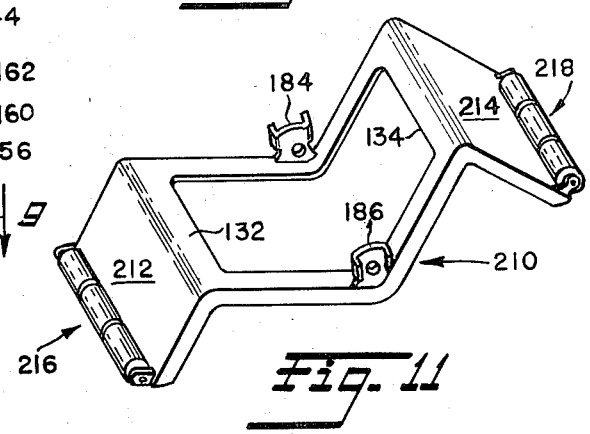

COMBINED SAFETY GUARD AND FLIP-OVER HANDLE FOR LAWNMOWERS

SUMMARY OF THE INVENTION

The present invention is directed to a novel, safety guard construction for a rotary lawnmower of the type provided with a reversible handle for mower travel in either of opposite directions, wherein the safety guard construction is interconnected with the handle so as to position the guard for operator protection in both directions of travel of the mower and to prevent the guard from interfering with efficient grass cutting.

Specifically, in one form of the invention the safety guard comprises guard members positioned at opposite ends of the mower deck and pivotally connected thereto, the guard members being connected with the reversible handle through a flexible cable so that when the handle is moved from one position to the other, the guard member at the trailing end of the mower, as defined by the intended direction of mower travel, is positioned in a guarding position, while the guard at the leading mower end is moved to a non-guarding position.

In a second form of the invention, the safety guard is directly connected with the handle which is pivoted to the deck. Thus, like the first form, the portion of the guard construction at the trailing end of the power ia automatically positioned, by handle movement, to protect the operator's feet while, simultaneously, the portion of the guard construction at the leading end of the mower is automatically positioned to prevent any interference with efficient grass cutting.

In both embodiments, a latch mechanism may be provided for releasably retaining the handle in spaced pivotal positions relative to the deck, the safety guard being positionable, after release of the latch mechanism, for operator protection in each direction of travel of the mower. The latch mechanism serves to prevent accidental or unintended reversal or flip-over of the handle during use of the mower and further insures that the guard at the trailing end of the mower is always in the guarding position to prevent the foot of the operator from coming into contact with the conventional rotatable blade positioned beneath the mower deck, and from being struck by stones or other hard objects which might be projected outwardly of the deck by the rotatable blade. Furthermore, the guard is shaped to facilitate unencumbered movement of the mower, both forward and reverse, from either end thereof. Hence the safety guard provides maximum safety for the operator while presenting no adverse effect respecting efficient mower operation.

The principal object of the present invention is hence to provide a novel guard construction for a rotary lawnmower of the type having a flip-over handle, the construction being such that the guard protects the feet of the operator in both directions of mower travel and does not affect mower cutting efficiency.

Another object of the invention is to provide, in a rotary lawnmower of the foregoing character, a novel safety guard construction including guard members pivotally mounted on the mower deck at opposite ends of the mower, the guard members extending between the mower wheels and being connected by a flexible cable with the flip-over handle so that the members are respectively moved to guarding and non-guarding positions with flip-over movement of the handle.

Another object of the invention is to provide, in a rotary lawnmower of the foregoing character, a novel safety guard which is pivotally mounted on the deck housing and directly and rigidly connected for pivotal movement with the handle during flip-over operation thereof, the guard being provided with separate guard portions which are moved to guarding the non-guarding positions with flip-over movement of the handle.

A further object resides in the provision of a novel unitary double guard construction for a lawnmower of the above type together with a latch mechanism for releasably latching the reversible mower handle in either position of forward and reverse mower travel, the arrangement being such that the double guard is moved and retained in position to protect the feet of the operator in both directions of mower travel without inhibiting mower movement or performance.

A still further object includes the provision of an improved handle, latch construction and safety guard arrangement of the above character which is relatively inexpensive to manufacture, rugged in constructiOn and reliable in use.

The above and other objects of the invention will appear more fully hereinafter from a consideration of the following detailed description when taken in connection with the accompanying drawings. It will be expressly understood however, that the drawings are utilized for purposes of illustration only and are not to be taken as a definition of the limits of the invention, reference for this latter purpose being had to the appended claims.

BRIEF DESCRIPTION OF THE DRAWINGS

FIG. 1 is a side elevational view of a rotary lawnmower schematically showing the present invention;

FIG. 2 is a side elevational view to an enlarged scale, showing a lawnmower including one form of the invention;

FIG. 3 is a top plan view of the construction shown in FIG. 2;

FIG. 3a is an enlarged view of a portion of FIG. 3;

FIG. 4 is an enlarged sectional view of the construction of FIG. 3 taken along the lines 4—4 thereof;

FIG. 5 is a side elevational view of a rotary lawnmower embodying the principles of the present invention and showing another form thereof;

FIG. 6 is a top plan view of the mower of FIG. 5;

FIG. 7 is a perspective view of one form of the double guard;

FIG. 8 is an enlarged sectional view of the latch mechanism and guard construction in position for normal mower operation;

FIG. 9 is a sectional view taken substantially along line 9—9 of FIG. 8;

FIG. 10 is a perspective view of another embodiment of the safety guard, and

FIG. 11 is a perspective view of still another embodiment of the safety guard.

DETAILED DESCRIPTION

Referring now more specifically to the drawings, a rotary lawnmower schematically showing the present invention is illustrated generally at 11 in FIG. 1 and is seen to include a deck housing 13 supported for movement along the ground by forward and rearward wheels 15, 17 respectively. The deck 13 is provided with a peripheral skirt 18 which defines the blade enclosing cavity in which rotary blade means 21 is disposed. A motor 23 is supported atop the deck 13 and drivingly engages the blade means 21.

A handle 25 extends upwardly from the deck housing 13 for control and manipulation of the mower 11. As shown, the handle 25 is pivoted to the deck housing 13 by pins 27 and is positionable as shown in solid lines and dot-dash lines in FIG. 1, in oppositely disposed, upwardly extending positions so that the mower 11 can be pushed in opposite longitudinal directions without having to turn the mower 11 around. This is a relatively common practice particularly in a number of electric-powered, corded lawnmowers, and facilitates back and forth mower movement without danger of cutting the electric cord.

One of the safety considerations in rotary lawnmowers resides in the need to protect the feet of the operator from accidentally coming in contact with the rotary blade means 21. In addition, it is important also to protect the operator from being struck by stones or other hard objects thrown outwardly by the rotating blade means 21.

Traditionally, the lower peripheral edge of the deck housing skirt of these lawnmowers, although below the plane of the rotary blade means, is necessarily spaced above the ground so that the mower can pass over the grass. To protect the feet of the user as he walks along behind the mower, many of them embody a "drag plate" or similar device which extends below the skirt and rides over the ground at the trailing end of the deck housing.

In mowers of the type illustrated herein, the "trailing end" changes at the end of each mower run since, to reverse the direction of travel, the user reverses the handle, e.g. flips the handle over, and pushes the mower from the opposite end, as distinguished from turning the mower around at the end of each run. It will be appreciated then that to properly protect the user's feet in these mowers, a guard is needed at both ends of the deck housing. However, while the guard at the trailing end of the deck (in the direction of movement) protects the operator's feet, the guard at the leading end of the deck can impede efficient mower use. This is so since a leading guard can engage the grass and lay it flat before it can be cut by the blade means. In addition, the taller uncut grass engaged by a leading guard offers resistance to mower movement.

In accordance with the present invention, novel guard means is provided at both ends of the deck housing and is interconnected with the movable handle so that in each direction of lawnmower travel, the guard means at the trailing end of the mower is in a position protecting the operator's feet, while the guard means at the leading end of the mower is withdrawn from the guarding position and does not interfere with cutting action of the blade means or with movement of the mower.

One such guard construction embodying the present invention is illustrated schematically in FIG. 1 as including a pair of guards 31, 33 each of which has a transverse apron 37 and a pair of laterally spaced mounting arms 39, 41. As shown, the arms 39, 41 are pivoted upon the deck 13 by pins 43, and each guard 31, 33 is movable from a raised, non-guarding position shown in full lines for the guard 31 in FIG. 1, to a lowered, guarding position shown in full lines for the guard 33.

The guards 31, 33 are interconnected with the handle 25 so that guards 31, 33 are movable into a desired respective position in response to reverse (e.g. flip-over) movement of the handle 25. Thus, when it is desired to move the mower 11 in a left hand direction, as seen in FIG. 1, the handle 25 is positioned as shown in full lines therein so that the operator can walk along behind the mower 11 and manipulate and control it by means of the handle. At this time, the guards 31, 33 are desirably positioned as shown in full lines therein, the guard 33 being in the lowered position to protect the operator's feet 46 from accidentally coming into contact with the blade means 21 and the guard 31 being raised to facilitate efficient cutting and easy movement of the lawnmower 11 in this direction. When the handle 25 is reversed and located in the position shown in dot-dash lines in FIG. 1, the mower 11 is adapted to be moved in a right-hand direction. In this instance, it is desirable that the guard 31 be lowered to a guarding position and the guard 33 raised to a non-guarding position, these positions being shown in dot-dash lines in FIG. 1.

Interconnection between the handle 25 and the guards 31, 33 is illustrated schematically as linkage means including link components 45, 47 suitably interconnecting the handle 25 with guard 31 and the handle 25 with the guard 33 respectively. It will be appreciated that this linkage means can be of a number of desired shapes and/or configurations including, for example, a cable, or the linkage means can reside in a direct connection of the guards to the handle as will be described. Thus, regardless of the direction of movement of the lawnmower 11, the guard at the trailing end thereof is located to protect the feet of the operator from accidentally gaining access to the rotating blade means 21. FIG. 1 illustrates an operator's foot 46 and the manner in which the guard 33 prevents accidental injury thereto.

One specific embodiment of guard construction and linkage means according to the present invention is illustrated in FIGS. 2–4. The mower shown there includes a deck housing 61 supported by forward wheels 63, 65 and rearward wheels 67, 69. A motor 71 is supported atop the deck 61 and drives a plurality of rotary blades 73, 75 disposed beneath the deck 61 and within a cavity defined by a peripheral skirt 77. A handle 79 is pivoted to lugs 81, 83 rigid with the deck 61 by pins 85, 87, respectively. As with the case in the construction described above, the handle 79 extends upwardly from the deck 61 for control and manipulation of the mower and is adapted to be reversed or flipped over to oppositely disposed, inclined positions. This is to facilitate manipulation and control of the mower in opposite longitudinal directions, that is, in a left-hand or right-hand direction as seen in FIGS. 2 and 3.

A pair of guards 91, 93 are pivotally secured at the forward and rearward ends of the deck housing 61 by pins 95, 96. These guards 91, 93 are movable from a retracted position substantially co-extensive with the lower peripheral edge of the skirt 77 to a guarding position where they extend somewhat below a lower peripheral edge of the skirt 77 and can engage the ground. The guards 91, 93 are interconnected with the handle 79 so that when viewing the direction of mower travel, the guard at the rearward or trailing end of the mower is always lowered and in the guarding position, while the guard at the leading end of the mower is in the raised or retracted position. This is achieved by means of an elongated flexible cable 99 interconnected at its ends to respective ones of the guards 91, 93 and at an intermediate point to the handle 79. As shown in FIG. 3a, the cable 99 may be connected with handle 79 by a simple wire clip 101 crimped on cable 99, and to the guards 91, 93 by an enlarged nut 105 (See FIG. 4). In the embodiment shown, the cable 99 extends through the wheel mounting portion of the deck housing 61 and is slidably guided therein by grommets 107. Thus, when the handle 79 is in the position shown in FIGS. 2 and 3, the trailing guard 91 is lowered and in the guarding position while the leading guard 93 is raised to facilitate entry of grass to the cutting blade means 73, 75 for efficient cutting thereof. When the handle 79 is flipped over to the opposite position from that shown in FIGS. 2 and 3, the cable 99 is moved linearly toward the right as seen in these figures thereby causing the guard 93 to drop downwardly into guarding position and the guard 91 to be raised into a non-guarding position. In this position of the parts, the mower normally travels in a left hand direction as seen in FIGS. 2 and 3.

An important feature is that the limited flexible nature of the cable 99 allows the guards 91, 93 to lift slightly when encountering an obstruction during mower travel. This prevents the mower from lifting off the ground in such cases. Furthermore, the guards 91 and 93 have their free edges directed upwardly to provide curved lips which further enables such edges to glide smoothly over the ground during mower operation. Thus, even if the mower is pulled rearwardly, as often occurs when trimming around shrubs, etc., it may be done without excessive drag by the guard.

From the above described construction it will be seen that the feet of the operator are protected from gaining access accidentally to the cutting chamber and being injured by the rotating cutting blade means for both directions of travel of the lawnmower. In addition, in both directions of travel of the lawnmower, the leading guard is raised and provides no barrier to efficient and effective cutting of the grass and does not impede mower travel.

A modified form of power-operated rotary lawnmower 110 embodying another version of the present invention is illustrated in FIGS. 5–7 and is seen as including a deck housing 112 supported for movement along the ground by pairs of forward and rearward wheels 114, 116 and 118, 120 respectively, the deck housing 112 supporting a motor 122 on its top side and being provided with a peripheral skirt 124 defining a cavity for housing rotary blade means (not shown) which is rotated by the motor 122 in conventional fashion. A U-shaped handle 126 is mounted on the deck housing 112 and extends upwardly therefrom so that the mower may be readily operator-controlled for grass cutting operation. More particularly, the handle 126 is pivotally mounted on pins 127 and 128 so as to be positioned in oppositely disposed, upwardly extending operative positions so that the mower may be pushed forwardly or rearwardly, FIG. 5 showing the handle adjusted to a position for movement of the mower toward the right. Thus, the handle 126 is capable of flip-over movement to facilitate back and forth mower operation without the necessity of turning the mower around.

The mower 110 includes a unitary guard 130 having a central plate member 131 providing a pair of angular related portions 132 and 134, the latter being cut away to define an opening 136 for accommodating the motor 122 when the guard 130 is mounted in operative position, the portions 132 and 134 thereby providing two pairs of angularly related arms 138, 140 and 142, 144. As shown, the guard 130 is pivotally supported on the pins 127, 128 and includes transverse guard apron portions 146 and 148 respectively, the guard portions being substantially co-extensive with the width of the deck housing 112 and rigidly formed with or connected to the outer ends of the arms 138, 142 and 140, 144 so that when the guard is moved by flip-over movement of the handle 126, from the position shown in FIG. 5, the guard apron 146 is moved from its lowered, guarding position as shown in FIG. 5 to the raised, non-guarding position while the guard apron 148 is moved from its raised, non-guarding position as illustrated in FIG. 5 to the lowered, guarding position. As shown, the free edges of the guard aprons 146 and 148 are directed upwardly to provide rounded lips to facilitate movement of the aprons over the ground for all directions of mower travel and all guard positions.

As heretofore stated, one of the inventive features herein is to provide latch means for the reversible handle so that the handle may be releasably maintained in either of its operative positions, so as to eliminate the possibility of inadvertent or accidental handle reversal during a normal run which might result in injury to the operator. One such construction is in FIGS. 8 and 9, and will be described in connection with FIGS. 5–7. However, it will be understood that this handle latch is usable with all forms of the invention shown herein.

Turning now to FIGS. 8 and 9, this latch means may be constructed in accordance with the patent to William R. Lessig, III, No. 3,481,123 dated Dec. 2, 1969 and assigned to the same assignee as the present application. As viewed in FIGS. 8 and 9 as well as FIG. 6, the lower ends 149 of the U-shaped handle 126 are mounted on the pins 127 and 128 for pivotal movement, the pins being mounted in channel-shaped lugs 150 and 152 projecting upwardly from the deck housing 112, each of the lugs having spaced apart legs 154, 156 terminating in inclined faces 158, 160. A latch body 162 having a slot 164 for receiving the pin 128 is slidably mounted on one of the handle ends 149 and is provided with bent-over tabs 166, 168 for embracing the handle end portion 149, the lower portion of the latch body 162 having a finger 170 receivable in either of a pair of recesses 172, 174 positioned on opposite sides of an upstanding boss 176 carried by the deck housing 112.

In order to move the latch body 162 relative to the handle 126, a cable 178 is secured to the body 162 by means of a screw 180 and the upper end of the cable is positioned on the handle 126 to be conveniently accessible to the operator, a suitable manually operable lever 182 being provided for sliding the latch upwardly and downwardly on the lower end portion 149 of the handle, in a manner clearly shown in the aforesaid patent. From this arrangement, it will be appreciated that the latch body 162 maintains the handle 126 in first and second substantially opposite, upwardly inclined operative positions relative to the deck housing 112, the first position of the latch body 162 being shown in full lines in FIG. 8 while the second position is illustrated in dotted lines. When the latch body 162 occupies the first position, the finger 170 will be positioned within the recess 172 and the handle end portion 149 will rest upon the face 158 of the lug 154. Release of the latch means is accomplished by merely operating the control lever 182 to slide the latch body 162 upwardly relative to the lower end portion 149 of the handle so that the finger 170 clears the boss 176, the slot 164 being of sufficient length to enable this movement to occur. Thereafter, the handle 126 may be flipped over to its second operative position whereupon the latch body 162 will occupy the dotted line position shown in FIG. 8 where the finger 170 is spring-projected into the recess 174. With such an arrangement, the handle position may be reversed at the end of each mower run in a controlled and deliverate manner so as to eliminate the possibility of inadvertent flip-over movement of the handle.

One of the important features of the invention resides in connecting the guard, here, double guard 130, with the lower handle portion 149 and the latch body 162 in such a manner that when the handle 126 is unlatched from one of its operative positions and flipped over to its other operative position and re-latched, the guard 130 will also be pivotally moved from the position shown in FIG. 1 to the opposite position and retained therein. As shown more particularly in FIGS. 7, 8 and 9, the foregoing operation is achieved by the provision of a pair of lugs 184, 186 secured to the guard 130 at the juncture of the arms 138, 140 and 142, 144 respectively. The lug 184 is provided with an opening 188 for receiving the pivot pin 128 and is also provided with a pair of ears 190 and 192 for embracing the latch body 162 and handle end portion 149 as shown in FIG. 9. Lug 186 is likewise provided with an opening 194 for receiving the pivot pin 127 and is also provided with a pair of ears 196, 198. Since the latch body 162 is associated only with the pivot pin 128, it will be understood that the ears 196, 198 will embrace the oppositely positioned handle end portion 149. With such an arrangement, it is clear that whenever the handle 126 is flipped from one of its operative positions to the other, as above stated, the double guard 130 will be likewise pivotally moved between its operative positions.

While FIG. 7 shows the double guard 130 as being of rigid, unitary construction, it may be desirable to form the guard in articulated sections. Such an arrangement is illustrated in FIG. 10 wherein the guard 200 is similar to the guard 130 of FIG. 7 except that the guard aprons 202 and 204 are respectively hingedly connected to the portions 132 and 134 by hinge pins 206, 208.

A further modified form of double guard 210 is illustrated in FIG. 11, wherein the guard aprons 212 and 214 are respectively provided with rollers 216 and 218 to facilitate movement of the mower over the ground when the aprons are moved to the guarding position. In the case of the double guard of FIGS. 7 and 10, the curved lips 220 and 222 formed at the lower edges of the guard aprons perform the same function as the rollers 216 and 218 of FIG. 11.

It will be readily apparent from the foregoing that during assembly of the parts, one of the lower end portions 149 of the handle 126 together with the latch body 162 is positioned on the pivot pin 128, see FIG. 9 while the other lower end portion 149 of the handle 126 is positioned on the pivot pin 127. Thereafter the double guard of FIGS. 7, 10 or 11 is located so that the openings 188 and 194 of the lugs 184 and 186 are respectively aligned with the pins 128 and 127. The latter are then moved into the openings 188 and 194 and secured in position by suitable clips, one of which is shown at 220.

With the parts thus assembled, the mower is conditioned for operation in either of opposite directions, the flip-over handle avoiding the necessity of turning the mower around at the end of each run; the releasable latch mechanism insuring against accidental or unintended flip-over movement of the handle, and the double, pivoted guard construction not only providing guarded and shielded protection for the operators feet at the trailing end of the mower but also ensuring unimpeded movement of the mower at the leading end.

While the invention has been shown and described herein with considerable particularity, it will be understood that the scope thereof is to be determined by the appended claims.

What is claimed is:

1. A rotary lawnmower of the type comprising a deck housing including a peripheral skirt supported by wheels for movement over the ground, a motor supported upon said deck and adapted to drive rotary blade means disposed beneath said deck and within said skirt, a handle extending upwardly from said deck and pivotally attached thereto at one end thereof and positionable in first and second oppositely disposed, upwardly inclined positions, whereby to facilitate manipulation and control of said lawnmower during movement thereof in opposite longitudinal directions; the improvement which comprises guard means pivotally supported on said deck and including first and second guard aprons at opposite ends of said deck, each of said guard aprons being provided with a curved portion at its free edge to facilitate movement of the guard apron over the ground during operation of the mower, means directly interconnecting said handle and said guard means and operable to cause said first guard apron to move to a guarding position below the skirt and into contact with the ground at one end of said deck, and said second guard apron to be raised to a non-guarding position above the skirt at the other end of said deck, when said handle is moved to said first position, said handle and said interconnecting means being operable to cause said second guard apron to move into a guarding position lower than the skirt and into contact with the ground at said other end of said deck, and to raise said first guard apron to a non-guarding position above the skirt at said one end of said deck housing, when said handle is moved to said second position.

2. A rotary lawnmower as set forth in claim 1 wherein said interconnecting means comprises a flexible cable connecting said handle with each of said first and second guard aprons.

3. A rotary lawnmower as set forth in claim 2 wherein said guard aprons are separately pivotally mounted at opposite ends of said deck.

4. A rotary lawnmower comprising a deck supported by wheels for movement along the ground in first and second, opposite, longitudinal directions, a motor mounted on said deck and adapted to drive rotary blade means disposed beneath said deck, a handle pivotally mounted on said deck and extending upwardly therefrom the movable from a first to a second position thereon to facilitate manipulation and control of movement of said mower in said first and second longitudinal directions, respectively, latch means for latching said handle in said first and second positions, manually operable means for releasing said latch means to enable movement of said handle to said first and second positions, and guard means having first and second guard aprons alternately positionable in guarding positions with respect to first and second ends, respectively, of said mower, said guard aprons, when in said guarding position, extending below the lower edge of said deck and substantially from side edge to side edge of said mower, and when moved out of said guarding position being higher than the lower edge of said deck, means interconnecting said guard means and said handle and operable to position said first guard apron in said guarding position in response to movement of said handle into said first position, and to position said second guard apron in said guarding position in response to movement of said handle into said second position.

5. A rotary lawnmower as set forth in claim 4, wherein said guard means comprises a pair of integral, angularly related portions the outer ends of which are respectively connected with said first and second guard aprons.

6. A rotary lawnmower as set forth in claim 5 wherein said angularly related portions are spaced-apart to define an opening for accommodating the motor when the guard means is pivotally supported on the deck.

7. A rotary lawnmower as set forth in claim 5 wherein a pair of spaced-apart lugs is positioned at the juncture of said angularly related portions for pivotally mounting the guard means on said deck.

8. A rotary lawnmower as set forth in claim 5 wherein at least one of said lugs is provided with spaced-apart ears engaging said latch means for pivotally moving the guard means in accordance with pivotal movement of said handle when the latch means is released.

9. A rotary lawnmower as set forth in claim 5 wherein said angularly related portions and said first and second guard aprons are integrally formed.

10. A rotary lawnmower as set forth in claim 5 wherein said guard aprons are hingedly connected respectively to the outer ends of said angularly related portions.

11. A rotary lawnmower as set forth in claim 5 wherein the free ends of said guard aprons are provided with upwardly curved portions co-extensive with the widths of said aprons.

12. A rotary lawnmower as set forth in claim 5 wherein the free ends of said guard aprons are provided with rollers.

13. A rotary lanwmower comprising a deck housing supported fore and aft by wheels adjacent the sides thereof, said deck housing defining a blade enclosure, rotary blade means disposed within said enclosure, a motor supported upon said deck housing and interconnected with said rotary blade means to drive the latter, handle means extending upwardly from said deck and movably supported thereon for movement from a first to a second oppositely disposed position, whereby to facilitate manipulation and control of said mower in opposite longitudinal directions, guard means including means integral therewith directly interconnected to said handle means, said guard means and said handle means being movable conjointly, said guard means including first and second aprons spanning substantially the lateral width of said deck and adapted to extend below said deck at opposite ends thereof, said handle being operable to lower the guard apron at the trailing end of said deck and raise the guard apron at the leading end of said deck in response to positioning of said handle for manipulation and control of said mower, whereby said guard aprons are positioned to protect the feet of the user from gaining access to the blade cavity as he walks along in back of the mower in either direction of movement thereof, and whereby said guard aprons present minimum impedance to grass cutting at the leading end of said mower.

14. A rotary lawnmower comprising a deck housing supported fore and aft by wheels adjacent the sides thereof, said deck housing defining a blade enclosure, rotary blade means disposed within said enclosure, a motor supported upon said deck housing and interconnected with said rotary blade means to drive the latter, handle means extending upwardly from said deck and movably supported thereon for movement from a first to a second oppositely disposed position, whereby to facilitate manipulation and control of said mower in opposite longitudinal directions, guard means including first and second members pivoted on said deck adjacent opposite ends thereof and adapted to extend below the level of said blade enclosure and having uninterrupted aprons spanning substantially the distance from wheel to wheel with opposite ends, respectively, of said deck housing, a flexible cable independent of said guard member pivots and interconnecting said guard members and said handle, and operable to lower the guard member at the trailing end of the deck and raise the guard member at the leading end of said deck in response to positioning said handle for manipulation and control of said mower, whereby said guard members are positioned to protect the feet of the user from gaining access to the blade cavity as he walks along in back of the mower in either direction of movement thereof, and whereby said guard members present minimum impedance to grass cutting at the leading end of said mower.

15. A rotary lawnmower comprising a deck housing supported fore and aft by wheels adjacent the sides thereof, said deck housing defining a blade enclosure, rotary blade means disposed within said enclosure, a motor supported upon said deck housing and interconnected with said rotary blade means to drive the latter, handle means extending upwardly from said deck and movably supported thereon for movement from a first to a second oppositely disposed position, whereby to facilitate manipulation and control of said mower in opposite longitudinal directions, guard means including first and second portions adjacent opposite ends thereof and adapted to extend below the level of said blade enclosure and having uninterrupted aprons spanning substantially the distance from wheel to wheel with opposite ends, respectively, of said deck housing, means flexibly interconnecting said guard means and said handle, and operable to lower the guard portion at the trailing end of said deck and raise the guard portion at the leading end of said deck in response to positioning said handle for manipulation and control of said mower, whereby said guard portions are positioned to protect the feet of the user from gaining access to the blade cavity as he walks along in back of the mower in either direction of movement thereof, and whereby said guard portions present minimum impedance to grass cutting at the leading end of said mower.

* * * * *